United States Patent [19]

Sugiyama

[11] Patent Number: 4,496,992
[45] Date of Patent: Jan. 29, 1985

[54] COLOR VIDEO SIGNAL REPRODUCING APPARATUS

[75] Inventor: Hiroyuki Sugiyama, Isehara, Japan

[73] Assignee: Victor Company of Japan, Ltd., Yokohama, Japan

[21] Appl. No.: 341,635

[22] Filed: Jan. 22, 1982

[30] Foreign Application Priority Data

Jan. 26, 1981 [JP] Japan .................................. 56-9920

[51] Int. Cl.³ ............................................ H04N 9/493
[52] U.S. Cl. ..................................... 358/326; 358/330
[58] Field of Search ............... 358/318, 324, 329, 322, 358/326, 310, 327, 330, 342; 369/43

[56] References Cited

U.S. PATENT DOCUMENTS 4,204,220  5/1980  Rutishauser ......................... 358/324
4,208,674  6/1980  Kuniyoshi et al. ................. 358/326
4,283,738  8/1981  Rutishauser ........................... 358/11

FOREIGN PATENT DOCUMENTS 2543652  4/1977  Fed. Rep. of Germany .
1434599  5/1976  United Kingdom .

Primary Examiner—John C. Martin
Assistant Examiner—Erin A. McDowell

Attorney, Agent, or Firm—Louis Bernat

[57] ABSTRACT

A color video signal reproducing apparatus comprises a carrier chrominance signal separation circuit for separating a carrier chrominance signal from a color video signal reproduced from a recording medium, a luminance signal separation circuit for separating a luminance signal from the reproduced color video signal, a demodulating circuit for demodulating the separated carrier chrominance signal into two color difference signals, where the demodulating circuit consists of demodulators for demodulating the carrier chrominance signal into the two color difference signals, an oscillator for supplying a predetermined frequency signal to the demodulators, and a control circuit for controlling the oscillation frequency of the oscillator according to a jitter component in the carrier chrominance signal, a reference signal producing circuit for producing a reference signal having a predetermined frequency, a modulating circuit for modulating the reference signal from the reference signal producing circuit, respectively, by the color difference signals from the demodulating circuit, and a color video signal obtaining circuit for obtaining a color video signal by adding an output signal of the modulating circuit and the separated luminance signal.

2 Claims, 2 Drawing Figures

COLOR VIDEO SIGNAL REPRODUCING APPARATUS

BACKGROUND OF THE INVENTION

The present invention generally relates to color video signal reproducing apparatuses, and more particularly to a color video signal reproducing apparatus which supplies a color video signal reproduced from a recording medium to a television receiver, after eliminating fluctuations in the phase and level of a carrier chrominance signal due to time-base fluctuation such as jitter included in the color video signal.

Generally, in a reproducing apparatus for reproducing a rotary recording medium (hereinafter simply referred to as a disc) on which a color video signal is recorded, due to such causes as irregular rotation of the disc, eccentricity of the disc, and curves formed in the recording surface of the disc, a time-base fluctuation component (hereinafter referred to as jitter) is included within the reproduced color video signal. Accordingly, in the conventional disc reproducing apparatus, a circuit is provided for compensating for the above jitter. This circuit separates a horizontal synchronizing signal from the reproduced color video signal, compares the phases of the separated horizontal synchronizing signal and an output signal of a crystal oscillator, and compensates for the jitter by use of an output error signal obtained as a result of the phase comparison.

However, the jitter within the reproduced color video signal could not be sufficiently compensated, by use of the jitter compensation circuit alone, in the above conventional reproducing apparatus. There was a disadvantage in that some jitter still remained within the reproduced color video signal after performing jitter compensation by the above jitter compensation circuit. On the other hand, generally, an automatic phase compensation circuit (APC circuit), an automatic chrominance control circuit (ACC circuit), and the like are provided in a television receiver. However, the television receiver is generally designed to receive broadcast signals having no jitter and displays a received image on the screen, and measures are not taken with respect to signals having jitter. Hence, when the reproduced signal in which some jitter still remains as described above, is supplied as it is to the television receiver, the hue and color saturations of the reproduced color picture varies according to the performance of the APC circuit and the ACC circuit which differ according to the manufacturer of the television receiver. Therefore, there was a disadvantage in that a reproduced color picture having a regular and stable picture quality could not be obtained.

SUMMARY OF THE INVENTION

Accordingly, it is a general object of the present invention to provide a novel and useful color video signal reproducing apparatus in which the above described disadvantages have been overcome.

Another and more specific object of the present invention is to provide a color video signal reproducing apparatus capable of effectively and positively eliminating a jitter component within a color video signal reproduced from a recording medium. The color video signal reproducing apparatus according to the present invention is provided with a chrominance signal demodulating circuit and a chrominance signal modulating circuit including an APC circuit, in addition to jitter compensation means which is conventionally provided. According to the reproducing apparatus of the present invention, sufficient compensation can relatively be performed with respect to the phase shift, so that undesirable effects are not introduced by the phase shift in the jitter still remaining due to the incomplete jitter compensation performed by the jitter compensation means.

Other objects and further features of the present invention will be apparent from the following detailed description when read in conjunction with the accompanying drawings.

DETAILED DESCRIPTION

Figure 1:
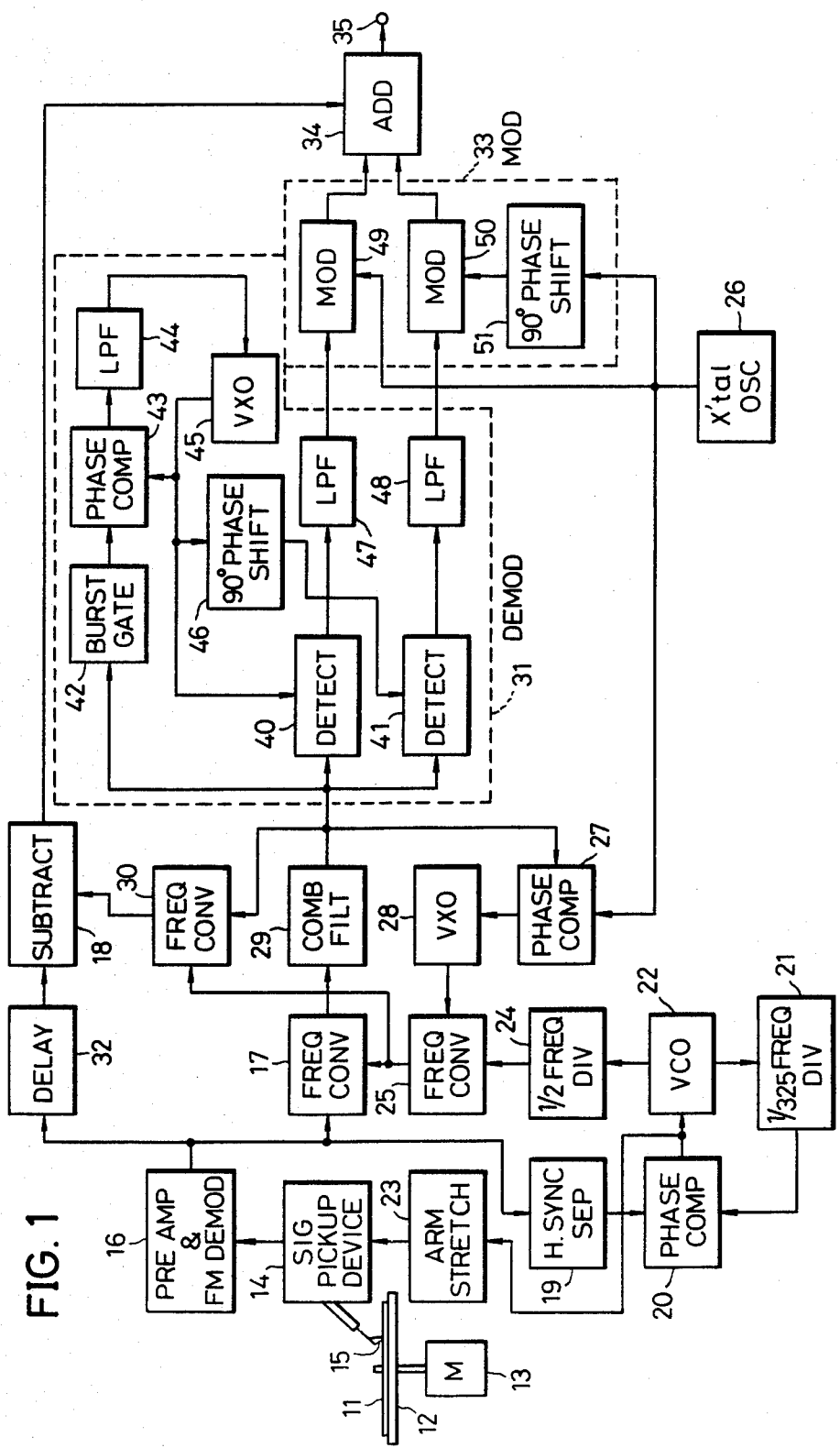
FIG. 1 is a systematic block diagram showing a first embodiment of a color video signal reproducing apparatus according to the present invention.

In FIG. 1, a disc 11 on which a color video signal is recorded as variations in geometrical configuration, is placed onto a turntable 12. The disc 11 is rotated at a predetermined rotational speed by a motor 13, together with the turntable 12. The color video signal recorded on the disc 11 is picked up by a reproducing stylus 15 of a signal pickup device 14, according to variations in electrostatic capacitance between the disc 11 and the reproducing stylus 15. The signal thus picked up by the signal pickup device 14 is supplied to a circuit 16 consisting of a preamplifier and an FM-demodulating circuit, wherein the signal is demodulated. An output color video signal of the above circuit 16 is supplied to a frequency converter 17, a subtraction circuit 18, and a horizontal synchronizing signal separation circuit 19. The above color video is, for example, a signal obtained by multiplexing a luminance signal having a band of zero to approximately 3 MHz and a carrier chrominance signal having a band of 2.56 MHz±500 kHz, within a common band.

A horizontal synchronizing signal (the frequency $f_H$ of the horizontal synchronizing signal frequency is 15.73 kHz in the case of the NTSC system color video signal) separated at the horizontal signal separation circuit 19 is supplied to a phase comparator 20. The phase comparator 20 compares the phases of the above separated horizontal synchronizing signal and a signal obtained from a 1/325-frequency divider 21 having a frequency $f_H$. An output error voltage of the phase comparator 20 is supplied to a voltage controlled oscillator (VCO) 22, to control the oscillation frequency of the VCO 22. The output oscillation frequency of the VCO 22 is 325 $f_H$ ($\approx$5.11 MHz). An output of the VCO 22 is supplied to the 1/325-frequency divider 21 and a ½-frequency divider 24. The above phase comparator 20, the VCO 22, and the frequency divider 21 construct a phase locked loop (PLL) circuit in order to control the oscillation frequency of the VCO 22 so that a jitter component within the color video signal is eliminated.

The output of the phase comparator 20 is also applied to an arm stretcher (a jitter compensation mechanism, not shown) of the signal pickup device, through an arm stretcher circuit 23. The position of the reproducing sytlus 15 along the relative scanning direction with respect to the disc 11 is corrected by the above mechanism, to perform the jitter compensation mechanically.

The output signal of the VCO 22 having the frequency of 5.11 MHz, is supplied to the ½-frequency divider 24 wherein the frequency is frequency-divided into a frequency of 2.56 MHz. This signal having the frequency of 2.56 MHz is supplied to a frequency converter 25. A signal from the frequency divider 24 is frequency-converted at the frequency converter 25, by a signal obtained from a voltage controlled type crystal oscillator (VXO) 28 having a frequency of 3.58 MHz. Accordingly, the signal from the frequency divider 24 is frequency-converted into a signal having a frequency of 6.14 MHz. An output signal of the frequency converter 25 is supplied to frequency converters 17 and 30.

The color video signal (having a carrier chrominance signal having a frequency of 2.56 MHz) including the jitter component, which is obtained from the circit 16, is frequency-converted into a signal having a frequency of 3.58 MHz by a signal (having a frequency of 6.14 MHz) from the frequency converter 25, at the frequency converter 17. The output signal of the frequency converter 17 is supplied to a comb filter 29. A carrier chrominance signal having a frequency of 3.58 MHz which is obtained at the above comb filter 29, is supplied to a chrominance signal demodulating circuit 31, a phase comparator 27, and the frequency converter 30.

The phase comparator 27 compares the phases of the carrier chrominance signal from the above comb filter 29 having the frequency of 3.58 MHz, and a reference signal supplied from a crystal oscillator 26 which has a frequency of 3.58 MHz. An output error voltage of the phase comparator 27 is applied to the VXO 28, to control the oscillation frequency of the VXO 28. Accordingly, the oscillation frequency of the VXO 28 fluctuates according to the jitter component present in the carrier chrominance signal which is obtained from the comb filter 29. A closed loop consisting of the frequency converters 17 and 25, the comb filter 29, the phase comparator 27, and the VXO 28 constructs an automatic phase compensation (APC) circuit. Thus, compensation is performed by the above described arm stretcher and the PLL circuit to compensate relatively for the remaining jitter component.

The carrier chrominance signal obtained from the comb filter 29, having the frequency of 3.58 MHz and nearly eliminated of the jitter component, is frequency-converted by a signal from the frequency converter 25 having the frequency of 6.14 MHz and a time-base which fluctuates according to the jitter component, at the frequency converter 30. The carrier chrominance signal including the jitter component and having the frequency of 2.56 MHz, is supplied to the subtraction circuit 18 from the frequency converter 30. The color video signal including the jitter component is supplied to the subtraction circuit 18 through a delay circuit 32 for matching the timing. Hence, the carrier chrominance signal is eliminated from the color video signal at the subtraction circuit 18, and only the luminance signal is obtained. The luminance signal thus obtained, is supplied to an adder 34.

The output carrier chrominance signal of the comb filter 29 which is supplied to the chrominance signal demodulating circuit 31, is supplied to detectors 40 and 41, and to a burst gate 42. This carrier chrominance signal is mostly eliminated of the jitter component, however, slight jitter component still remains within the carrier chrominance signal.

A color burst signal extracted at the burst gate 42 is supplied to a phase comparator 43. The phase comparator 43 compares the phases of the signal supplied thereto and the output signal from a VXO 45 having a frequency of 3.58 MHz. An output phase error signal of the phase comparator 45 is applied to the VXO 45 through a lowpass filter 44, to control the oscillation frequency of the VXO 45. In addition to being supplied to the phase comparator 43, the output signal of the VXO 45 is also supplied directly to the detector 40, and to the detector 41 through a 90°-phase shifter 46. Accordingly, an I-signal and a Q-signal from which the jitter component is completely compensated, are obtained from the above detectors 40 and 41. These I-signal and Q-signal are respectively supplied to modulators 49 and 50 of a modulating circuit 33, through lowpass filters 47 and 48.

The filtering band of the above lowpass filter 44 is selected so as to sufficiently pass the jitter component. In a case where the disc 11 is rotated at a rotational speed of 900 rpm, for example, the jitter frequency is 15 Hz. Thus, in this case, the upper limit frequency of the filtering band of the lowpass filter 44 is selected in the range of 60 Hz, for example, so that the signal having this frequency of 15 Hz is sufficiently passed.

The output signal of the crystal oscillator 26 having the frequency of 3.58 MHz, is directly supplied to the modulator 49, and supplied to a 90°-phase shifter 51 through the modulator 50, respectively as a chrominance sub carrier. The modulators 49 and 50 modulate the above chrominance sub carrier thus supplied thereto, by the I-signal and Q-signal obtained from the demodulating circuit 31. A rectangular two-phase modulated signal obtained from the modulating circuit 33 is supplied to the adder 34, and added with the luminance signal from the subtraction circuit 18. A reproduced color video signal obtained from the adder 34 is supplied to a television receiver through an output terminal 35.

As described above, in the apparatus according to the present invention, the remaining jitter component is completely eliminated by the APC circuit within the chrominance signal demodulating circuit 31. Moreover, since the modulation in the modulating circuit 33 is performed by use of a constant frequency signal from the crystal oscillator 26, the jitter component wil not be mixed into the compensated signal.

Furthermore, the color difference signals obtained from the detectors 40 and 41 does not necessarily have to be the I-signal and Q-signal. In addition, phase shifters of an arbitrary angle may be used instead of the 90°-phase shifters 46 and 51. All that is required is that the shifting angles of the phase shifters 46 and 51 are mutually the same.

Although not shown in FIG. 1, an ACC circuit may be provided within the above chrominance signal demodulating circuit 31.

Figure 2:
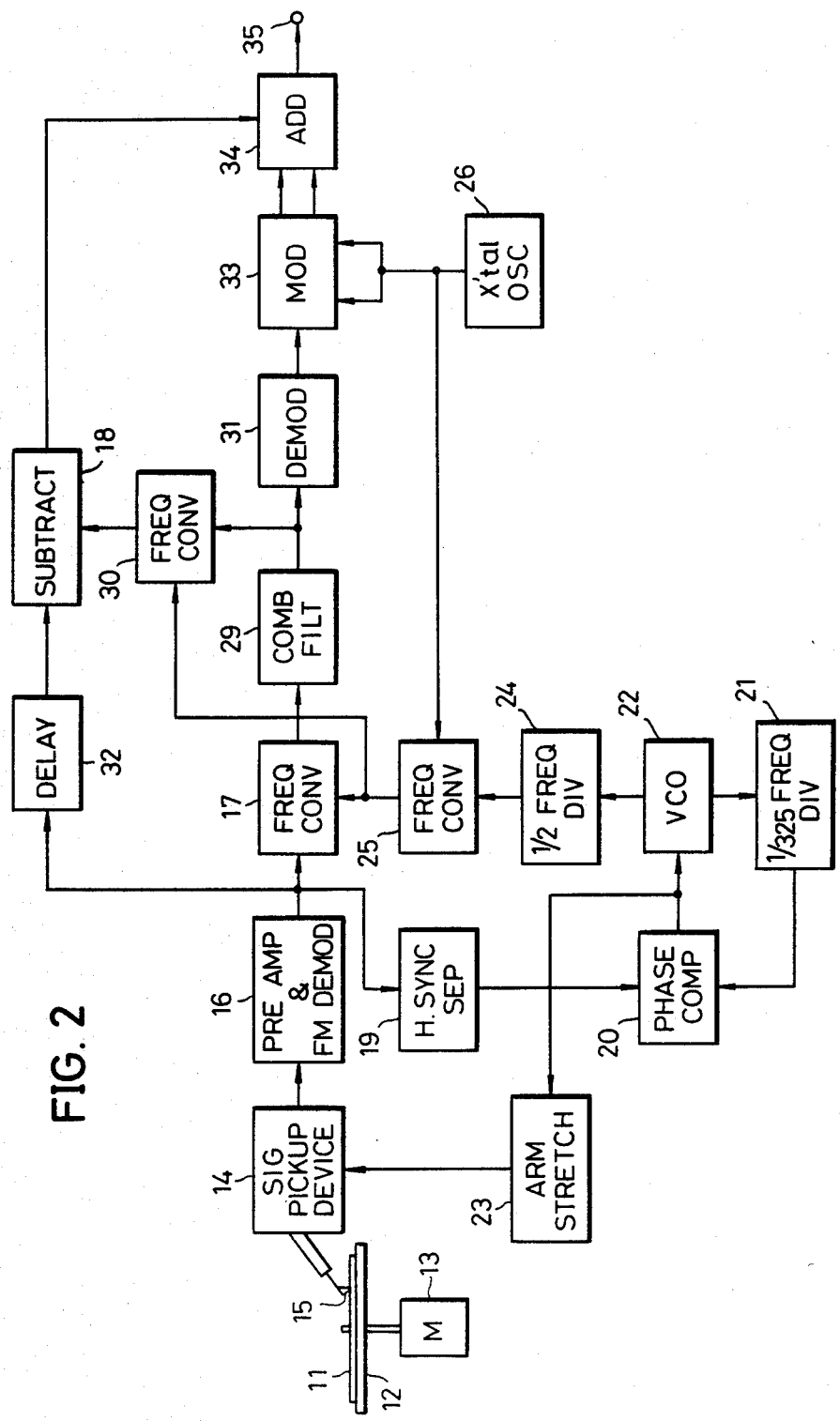
FIG. 2 is a systematic block diagram showing a second embodiment of a color video signal reproducing apparatus according to the present invention.

A second embodiment of a color video signal reproducing apparatus according to the present invention is shown in FIG. 2. In FIG. 2, those parts which are the same as those corresponding parts in FIG. 1 are designated by the same reference numerals, and their description will be omitted. In the present embodiment of the invention, the phase comparator 27 and the VXO 28 provided in the above first embodiment of the invention are omitted. Moreover, the frequency converter 25 is supplied with the output signal of the crystal oscillator 26 having the frequency of 3.58 MHz. According to the present embodiment of the invention, a jitter compensating function is not obtained by the loop including the phase comparator 27, and the VXO 28. However, in a case where the jitter component present in the color video signal which is picked up is small, practically sufficient jitter compensation can be performed by the arm stretcher and the chrominance signal demodulating circuit 31.

In each of the above described embodiments of the present invention, description was given with respect to an apparatus for reproducing a color video signal from a disc. However, the present invention is not limited to the above, and for example, the apparatus may be an apparatus for reproducing a color video signal from a magnetic tape, by use of a similar construction.

Further, the present invention is not limited to these embodiments, but various variations and modifications may be made without departing from the scope of the present invention.

What is claimed is:

1. A color video signal reproducing apparatus comprising:
   frequency converting means for frequency-converting a color video signal reproduced from a recording medium;
   reference signal producing means for producing a reference signal;
   means responsive to said reference signal for producing a frequency converting signal which is supplied to said frequency converting means;
   carrier chrominance signal separation means responsive to said frequency converting means for separating a carrier chrominance signal from a color video signal;
   luminance signal separation means for separating a luminance signal from said reproduced color video signal;
   demodulating circuit means for demodulating said separated carrier chrominance signal into two color difference signals, said demodulating circuit means comprising an oscillator for supplying a frequency signal to said demodulating circuit means, and a control circuit for controlling the oscillation frequency of said oscillator according to a jitter component in said carrier chrominance signal;
   modulating circuit means for modulating the reference signal from said reference signal producing means by the color difference signals from said demodulating circuit means; and
   color video signal obtaining means for obtaining a color video signal by adding an output signal of said modulating circuit and said separated luminance signal,
   said frequency converting means comprising a first frequency converter means for frequency-converting said reproduced color video signal,
   said frequency converting signal producing means comprising a second frequency converter for supplying a frequency-converting signal to said first frequency converter, horizontal synchronizing signal separation means for separating a horizontal synchronizing signal from the reproduced color video signal, a voltage controlled oscillator responsive to said separated horizontal synchronizing signal for supplying an output signal to said second frequency converter, and a voltage controlled crystal oscillator responsive to a phase difference between the phases of the separated carrier chrominance signal and the output signal of said reference signal producing means for supplying an output signal to said second frequency converter.

2. A color video signal reproducing apparatus comprising:
   first frequency converter means for frequency-converting a color video signal reproduced from a recording medium;
   carrier chrominance signal separation means responsive to said first frequency converter for separating a carrier chrominance signal from a color video signal;
   second frequency converter means for supplying a frequency-converting signal to said first frequency converter;
   horizontal synchronizing signal separation means for separating a horizontal synchronizing signal from the reproduced color video signal;
   voltage controlled oscillator means responsive to said separated horizontal synchronizing signal for supplying an output signal to said second frequency converter;
   voltage controlled crystal oscillator means responsive to the separated carrier chrominance signal for supplying an output signal to said second frequency converter;
   demodulating circuit means for demodulating said separated carrier chrominance signal into two color difference signals, an oscillator for supplying a frequency signal to said demodulator circuit means, and a control circuit for controlling the oscillation frequency of said oscillator according to a jitter component in said carrier chrominance signal;
   reference signal producing means for producing a reference signal;
   modulating circuit means for modulating the reference signal from said reference signal producing means by the color difference signals from said demodulating circuit means;
   luminance signal separation means for separating a luminance signal from said reproduced color video signal; and
   color video signal obtaining means for obtaining a color video signal by adding an output signal of said modulating circuit means and said separated luminance signal.

* * * * *